United States Patent Office 3,333,520
Patented Aug. 1, 1967

3,333,520
POLYMER PRODUCT
Neil K. McGivney, Millis, Mass., assignor to Celanese Corporation, a corporation of Delaware
No Drawing. Continuation of application Ser. No. 232,604, Oct. 23, 1962. This application Dec. 9, 1964, Ser. No. 417,198
4 Claims. (Cl. 95—11)

This application is a continuation of application Ser. No. 232,604 filed Oct. 23, 1962, now abandoned.

This invention relates to articles having a relatively small effect on light-sensitive materials.

It is an object of this invention to provide improved shaped articles adapted to be used in conjunction with a light-sensitive material. It is a further object of this invention to provide an improved product including a combination of a polymeric, resinous material and a light-sensitive material, said polymeric resinous material having a small effect on said light-sensitive material. Other objects will be apparent from the following detailed description and claims.

In accordance with one aspect of the invention, a shaped article adapted to be used in conjunction with a light-sensitive material is composed of an oxymethylene polymer having carbon-to-carbon bonds in the main polymer chain.

The preferred oxyalkylene polymers are comprised of oxymethylene units and oxyalkylene (or substituted oxyalkylene) units containing more than one carbon atom wherein the latter oxyalkylene units represent from 0.5 to 25 mol percent of the copolymer. A particularly suitable method of preparing such polymers is by copolymerizing trioxane and a cyclic ether with adjacent carbon atoms, e.g., as described in Patent No. 3,027,352, incorporated herein by reference. The preferred copolymers are those comprising oxymethylene and oxyethylene units such as copolymers of trioxane and dioxolane or ethylene oxide.

The preferred copolymers, e.g., prepared in accordance with Patent No. 3,027,352, are random copolymers in the sense that the higher oxyalkylene units are distributed among the oxymethylene units and are not concentrated in large blocks or segments. While the distribution of the higher oxyalkene units is dependent upon the proportion thereof and the manner of contact and mixing, in general, at least 80% of the higher oxyalkylene units are present in the polymer in segments of from one to three oxyalkylene units.

The copolymers which have interspersed carbon-to-carbon linkages are stabilized for improved thermal resistance and improved alkali resistance by a thermal treatment to remove the unstable end portions of the molecules consisting of successive terminal oxymethylene groups until a stable terminal group having a carbon-to-carbon linkage is reached. The degradation may be by thermal degradation, as disclosed in French Patent No. 1,253,553 or by hydrolysis, as disclosed in French Patent No. 1,287,151. The copolymer used in this invention may be stabilized by either of these methods.

If desired, antioxidant stabilizing agents such as described in copending application Ser. No. 792,280 filed Feb. 10, 1959, by Dolce, may be added, in amounts between about 0.1 and about 2% based on the weight of the polymer.

In addition to the aforementioned stabilizing agents, it has been found advantageous to incoporate an ingredient that inhibits chain scission, as disclosed, for example, in French Patent No. 1,273,219. The scission inhibitor may be added in amounts of from 0.1% to 5% based on the weight of the copolymer. Preferably amounts from about 0.2% to 2% by weight are used.

The contemplated polymer may be shaped into various articles which are used in conjunction with light-sensitive material. Such articles include, for example, camera and X-ray machine parts; housings, spools and frames for photographic and X-ray film; safety slides; plate and cut film holders; clips and frames for developing exposed film; developer trays; tanks, tongs and clips for drying negatives and positives; and enlarging machines and frames. In many of these applications, the part designed to be used with the light-sensitive material is from 1 to 500 mils away from such light-sensitive material when in active use. These articles may be shaped using conventional techniques of injection or compression molding, extrusion or casting.

The light-sensitive materials contemplated under this invention are those well known in the art, e.g., those which occur in commercial photographic film, such as silver salts, including silver chloride, silver bromide, silver iodide, silver iodobromide and mixtures thereof. The light-sensitive material may contain any of various sensitizers, e.g., sulfur compounds, such as 1-alkyl-2-thiourea or sodium thiosulfate, stannous salts or complex gold salts.

To demonstrate the small effect on light-sensitive materials of the oxymethylene polymer containing recurring carbon-carbon bonds in the main polymer chain used in accordance with this invention, two injection molded ⅛ inch plaques were prepared. One of said plaques was made of an oxymethylene homopolymer having acetyl-end groups and stabilized in the usual manner. The degradation rate of the stabilizer polymer at 230° C. in air was 0.018–0.024%/min.

The other plaque was made of an oxymethylene copolymer containing about 2 wt. percent of monomeric units from ethylene oxide. The copolymer was prepared by the copolymerization of trioxane and ethylene oxide followed by a thermal treatment to remove unstable terminal oxymethylene end groups. After filtration, washing and drying the polymer was stabilized as disclosed in French Patent No. 1,273,219. The degradation rate of the stabilized copolymer at 230° C. in air was 0.018–0.21%/min.

The relative effects of the above homopolymer and copolymer on photographic film were determined as follows:

Six sheets of standard black interleaving paper were placed in the bottom of each of two cut-film boxes as a cushion, and a sheet of Kodak Panatomic-X film, a slow-speed film, was placed on top of the black sheets in each box emulsion side up. The above-described copolymer plaque was placed across the center of the Panatomic-X film in one box so that it covered a portion thereof and the homopolymer plaque was similarly placed on the film in the other box. On top of each plaque in each box, a sheet of Kodak Royal Pan film, a high-speed film, was laid emulsion side down. Six sheets of black interleaving paper were placed on top of each sheet of Royal Pan film as a cushion and six plates of lantern slide glass were placed on top of the sheets of paper to provide pressure and keep the sample from shifting. Each box was closed and sealed. The above procedure was carried on in total darkness.

The boxes were incubated ten days at 50° C. and then one-half the area of the films in each box, including half the area opposite the polymer plaques, was flashed a single time to a relatively low exposure density. One-half of the previously flashed area, including half of the flashed area opposite the plaques, was again flashed to a higher exposure density. One-half of the area of each film was left unexposed.

All the films were developed simultaneously for five minutes in a full strength standard high contrast developer at 68° F. with agitation. An acetic acid short stop was used (½%) for 30 seconds, and the films were then fixed in fresh acid fixer for five minutes, and were washed and dried.

In the case of the Panatomic-X film in contact with the homopolymer plaque, the emulsion reticulated and became hazy over both exposed and unexposed areas, an extremely undesirable phenomenon. This did not happen with the film which had been in contact with the copolymer plaque.

With the Royal Pan film, the copolymer plaque did not cause any reticulation of the emulsion, while the homopolymer plaque still caused the serious reticulation over both the exposed and unexposed areas.

In addition to the preparation disclosed in Patent No. 3,027,352, other methods may be used to prepare oxymethylene polymers containing recurring carbon-to-carbon bonds, including, for example, those taught by Kern et al., in Angewandte Chemie 73 (6) 177–186 Mar. 21, 1961.

It is to be understood that the foregoing detailed description is given merely by way of illustration and that many variations may be made therein without departing from the spirit of my invention.

The embodiments of the invention in which an exclusive property or privilege is claimed are defined herein as follows:

1. A photographic article comprising:
   (i) a light-sensitive photographic film comprising at least one salt selected from the class consisting of silver chloride, silver bromide, silver iodide, and silver iodobromide, and
   (ii) an oxymethylene copolymer member, said copolymer member comprising oxymethylene ($-CH_2O-$) units interspersed with oxyalkylene ($-O-R-$) units wherein R is a divalent radical containing at least two carbon atoms directly linked to each other and positioned in the copolymer chain between the two valences, any substituent in said R radical being inert, said oxyalkylene units constituting from 0.5 to 25 mol percent of said copolymer, and
   (iii) wherein the film is positioned from 1 to 500 mils away, in space relation, from the oxymethylene copolymer member.

2. An article as defined in claim 1 which is a camera.

3. An article as defined in claim 1 wherein the oxyalkylene units are oxyethylene units.

4. A method of preventing the occurrence of deleterious effects upon a light-sensitive photographic film during the exposure thereto of visible light and X-rays, said photographic film comprising at least one silver salt selected from the class consisting of silver chloride, silver bromide, silver iodide and silver iodobromide, which comprises constructing a support for the photographic film of an oxymethylene copolymer, said copolymer comprising oxymethylene ($-CH_2O-$) units interspersed with from 0.5 to 25 mol percent, based on the copolymer, of oxyalkylene ($-O-R-$) units wherein R is a divalent radical containing at least two carbon atoms directly linked to each other and positioned in the polymer chain between the two valences, any substituent in said R radical being inert, and wherein the photographic film is from 1 to 500 mils away, in space relation, from the oxymethylene copolymer.

References Cited
UNITED STATES PATENTS

| | | | |
|---|---|---|---|
| 2,989,509 | 6/1961 | Hudgin et al. | 260—67 |
| 2,989,511 | 6/1961 | Schnizer | 260—67 |

NORMAN G. TORCHIN, *Primary Examiner.*

R. H. SMITH, *Assistant Examiner.*